US009743238B2

United States Patent
Venkatraman et al.

(10) Patent No.: US 9,743,238 B2
(45) Date of Patent: Aug. 22, 2017

(54) PROXIMITY BASED DEVICE USAGE

(71) Applicant: QUALCOMM Incorporated, San Diego, CA (US)

(72) Inventors: Sai Pradeep Venkatraman, Santa Clara, CA (US); Weihua Gao, San Jose, CA (US); Benjamin Werner, Sunnyvale, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/621,912

(22) Filed: Feb. 13, 2015

(65) Prior Publication Data

US 2016/0242000 A1 Aug. 18, 2016

(51) Int. Cl.
| | |
|---|---|
| *H04W 4/22* | (2009.01) |
| *H04W 4/02* | (2009.01) |
| *G01S 5/00* | (2006.01) |
| *H04W 4/00* | (2009.01) |
| *H04W 4/08* | (2009.01) |
| *H04W 4/20* | (2009.01) |
| *H04W 64/00* | (2009.01) |

(Continued)

(52) U.S. Cl.
CPC .......... *H04W 4/023* (2013.01); *G01S 5/0072* (2013.01); *G01S 5/02* (2013.01); *G01S 5/0263* (2013.01); *G01S 19/51* (2013.01); *H04W 4/008* (2013.01); *H04W 4/028* (2013.01); *H04W 4/08* (2013.01); *H04W 4/206* (2013.01); *H04W 64/00* (2013.01); *H04W 4/22* (2013.01)

(58) Field of Classification Search
CPC ....... H04W 4/02; H04W 64/00; H04W 4/023; H04W 4/008; H04W 4/08; H04W 4/206; H04W 4/22; H04W 4/028; H04L 29/08657; H04L 29/08108; H04L 29/08936; G01S 5/0072; G01S 19/51; G01S 5/02; G01S 5/0263
See application file for complete search history.

(56) References Cited

U.S. PATENT DOCUMENTS

| | | | |
|---|---|---|---|
| 8,483,705 | B1 | 7/2013 | Cope et al. |
| 9,441,976 | B2 | 9/2016 | Venkatraman et al. |
| 2009/0264137 | A1 | 10/2009 | Soliman |

(Continued)

FOREIGN PATENT DOCUMENTS

WO    WO-2016036770    3/2016

OTHER PUBLICATIONS

International Search Report and Written Opinion—PCT/US2016/013679—ISA/EPO—Apr. 13, 2016.

*Primary Examiner* — Ted Wang
(74) *Attorney, Agent, or Firm* — Silicon Valley Patent Group LLP

(57) ABSTRACT

A method of performing functions by proxy for a set of associated proximate devices is disclosed. In some embodiments, the method may comprise associating a set of user equipments (UEs), wherein upon determination that a first UE in the set is unavailable for performing a requested function, at least one alternate second UE in the associated set of UEs is selected, wherein the at least one second UE is proximate to the first UE and the at least one second UE is available for performing the requested function. The performance of the requested function on the at least one second UE is initiated.

26 Claims, 7 Drawing Sheets

(51) Int. Cl.
*G01S 19/51* (2010.01)
*G01S 5/02* (2010.01)

(56) References Cited

U.S. PATENT DOCUMENTS

| | | |
|---|---|---|
| 2010/0137002 A1 | 6/2010 | Agarwal et al. |
| 2011/0260858 A1 | 10/2011 | Eruchimovitch et al. |
| 2013/0179544 A1 | 7/2013 | Sainnsbury |
| 2013/0185368 A1* | 7/2013 | Nordstrom .............. H04L 51/32 709/206 |
| 2014/0065997 A1 | 3/2014 | Walker et al. |
| 2014/0095617 A1 | 4/2014 | Chan et al. |
| 2014/0213283 A1 | 7/2014 | Gillett |
| 2015/0004927 A1* | 1/2015 | Mao ..................... H04W 72/10 455/404.2 |

* cited by examiner

PROXIMITY BASED DEVICE USAGE

FIELD

The subject matter disclosed herein relates to positioning and specifically, to performing functions on devices based on their proximity to other devices.

BACKGROUND

It is often desirable to perform positioning functions on user equipment (UE) such as a mobile terminal, a cellular phone or other mobile device. The terms "location" and "position" are synonymous and are used interchangeably herein. For example, a location services (LCS) client may desire to know the location of a UE in the case of an emergency services call or to provide some service to the user of the terminal such as navigation assistance or direction finding. Accordingly, in the situation described above, position determination operations may be initiated to know the location of the UE. However, in the example above, if a UE is, or becomes, unavailable during the session, positioning services may be unable to determine the location of the device. For example, if a device loses power during an emergency service call, emergency responders may be unable to use positioning functions on the device to determine the location of the device.

Therefore, there is a need for apparatus, systems and methods to facilitate the performance of various functions even in situations when a UE, or one or more functions supported by the UE are unavailable.

SUMMARY

In some embodiments, a method may comprise: associating a set of user equipments (UEs); determining that a first UE in the set of associated UEs is unavailable for performing a requested function; selecting at least one second UE in the set of associated UEs, wherein the at least one second UE is proximate to the first UE and the at least one second UE is available for performing the requested function; and initiating a performance of the requested function on the at least one second UE.

In another aspect, an apparatus may comprise: a transceiver capable of communicating with a set of associated user equipments (UEs); and a processor coupled to the transceiver. In some embodiments, the processor may be configured to: associate the set of UEs; determine that a first UE in the set of associated UEs is unavailable for performing a requested function; select at least one second UE in the set of associated devices, wherein the at least one second UE is proximate to the first UE and the at least one second UE is available for performing the requested function; and initiate, via the transceiver, a performance of the requested function on the at least one second UE.

In a further aspect, an apparatus may comprise: means for communicating with a set of associated UEs; means for associating the set of UEs; means for determining that a first UE in the set of associated UEs is unavailable for performing a requested function; means for selecting at least one second UE in the set of associated UEs, wherein the at least one second UE is proximate to the first UE and the at least one second UE is available for performing the requested function; and means for initiating a performance of the requested function on the at least one second UE.

In some embodiments, a non-transitory computer-readable medium may comprise instructions that are executable by a processor to: associate a set of user equipments (UEs); determine that a first UE in the set of associated UEs is unavailable for performing a requested function; select at least one second UE in the set of associated UEs, wherein the at least one second UE is proximate to the first UE and the at least one second UE is available for performing the requested function; and initiate a performance of the requested function on the at least one second UE.

The methods disclosed may be performed by one or more of servers (including location servers), UEs, etc. using various protocols. Embodiments disclosed also relate to software, firmware, and program instructions created, stored, accessed, read or modified by processors using non-transitory computer readable media or computer readable memory.

BRIEF DESCRIPTION OF THE DRAWINGS

Embodiments of the invention will be described, by way of example only, with reference to the drawings.

DETAILED DESCRIPTION

Embodiments disclosed facilitate positioning related operations and other desired functions that may usually be performed by a device, when that device is unavailable. For example, a device may be unavailable because of power loss, low battery, user configuration of the device, and/or disabling of one or more functions on the device. In some embodiments, to facilitate performance of positioning related operations and other desired functions when a device is unavailable, a set of user equipments (UEs) may be associated. Upon determining that a first UE in the set is unavailable for performing a desired function, one or more second UEs in the associated set of UEs may be selected to perform the desired function. For example, the one or more second UEs selected to perform the desired function may be proximate to the first UE and may be available for performing the desired function. The performance of the desired function may then be initiated on the one or more second UEs. The term "proximity based device usage" is used to refer to the performance of desired functionality using a second device based on a prior association with and a current proximity to a first device.

The terms "user equipment" (UE) or "mobile station" (MS), may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms UE, "mobile station" or "target" are intended to include all devices, including wireless and wireline communication devices, computers, laptops, etc. which are capable of communication with a server, such as via the Internet, WiFi, cellular wireless network, DSL network, packet cable network or other network, and regardless of whether satellite signal reception, assistance data reception, and/or position-related processing occurs at the device, at a server, or at another device associated with the network. Any operable combination of the above are also considered UEs.

Figure 1:
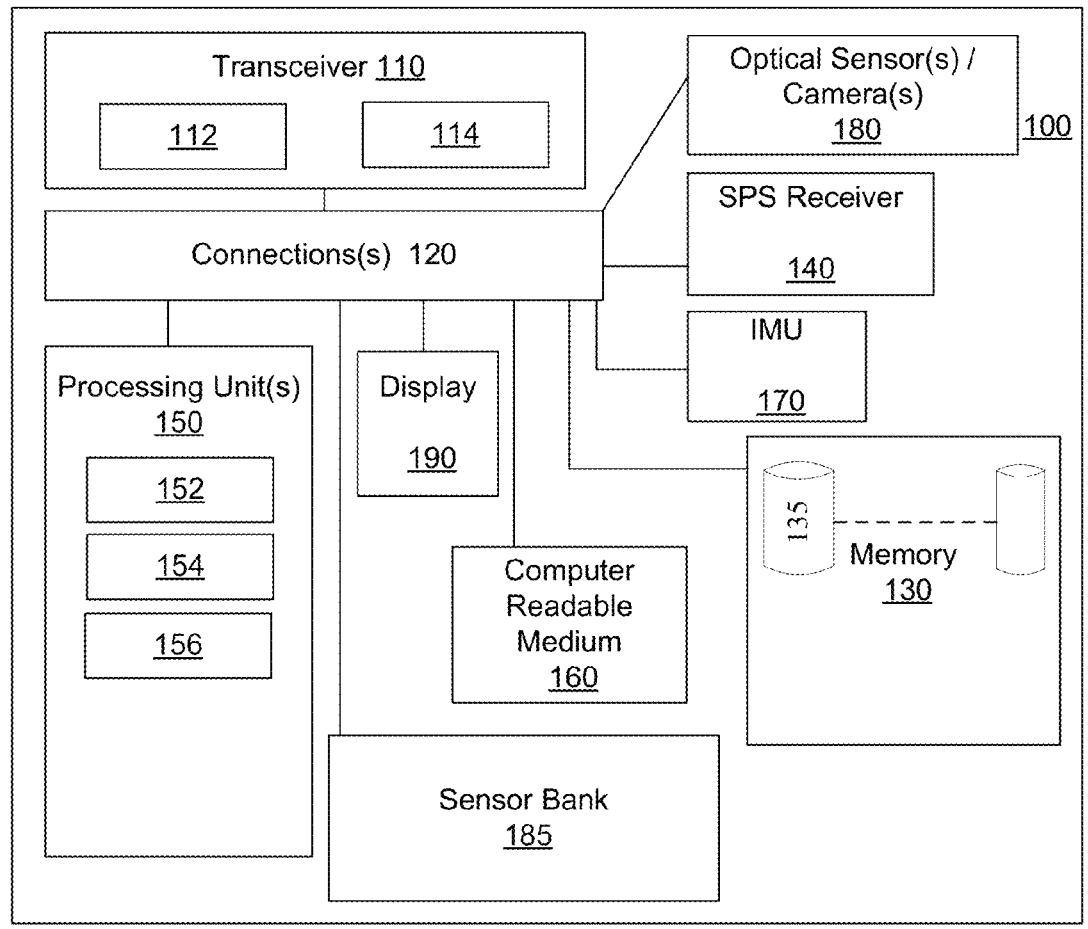
FIG. 1 shows a schematic block diagram illustrating certain exemplary features of a UE 100 enabled to support proximity based device usage in accordance with certain embodiments presented herein.

FIG. 1 shows a schematic block diagram illustrating certain exemplary features of UE 100 enabled to support proximity based device usage in accordance with certain embodiments presented herein. In some embodiments, functions on UE 100 or one or more associated UEs or other devices (not shown in FIG. 1), may be triggered based on a combination of wireless signal and/or sensor based proximity determinations. In some embodiments, UE 100 may take the form of a wearable user device, such as a wristwatch, spectacles etc., where one or more functional components of UE 100 may be physically separate but operationally coupled to other functional components. For example, display 190 may be physically separate but operationally coupled processing unit(s) 150 and/or other functional units in UE 100.

UE 100 may, for example, include one or more processing units or processing unit(s) 150, memory 130, a transceiver 110 (e.g., wireless network interface) comprising transmitter 112 and receiver 114, and (as applicable) Global Navigation Satellite System (GNSS) or Satellite Positioning System (SPS) receiver 140, optical sensors/camera(s) 180, Inertial Measurement Unit (IMU) 170, and sensor bank or sensors 185.

In some embodiments, sensors 185 may comprise magnetometer, altimeter, barometer, which may provide inputs to processing unit(s) 150 to facilitate position determination. For example, measurements by the altimeter may be used to provide an indication of altitude above a calibrated level, while the measurements by the barometer may provide an indication of atmospheric pressure, which may also be used to obtain a determination of altitude. As another example, the magnetometer may be capable of measuring the intensity and/or the direction of the Earth's magnetic field and may serve as a compass and/or provide measurements that may be use to obtain an indication of a direction of travel of UE 100. UE 100 may further comprise computer-readable medium 160, display 190, and memory 130, which may be operatively coupled to each other with one or more connections 120 (e.g., buses, lines, fibers, links, etc.). In certain example implementations, all or part of UE 100 may take the form of a chipset, and/or the like.

In some embodiments, processing unit(s) 150 may also receive input from various other sensors 185, which may include one or more of ultrasonic transducers and/or depth sensors, which may be used to acquire depth information and/or determine distance. In general, the list of sensors above in not exhaustive and sensor bank 185 may include various other types of sensors and transducers which are increasingly being incorporated into modern smartphones and other user devices.

SPS receiver 140 may be enabled to receive signals associated with one or more SPS/GNSS resources. Received GNSS signals may be used to determine a position of UE 100. Transceiver 110 may, for example, include a transmitter 112 enabled to transmit one or more signals over one or more types of wireless communication networks and a receiver 114 to receive one or more signals transmitted over one or more types of wireless communication networks.

In some embodiments, UE 100 may comprise image sensors such as CCD or CMOS sensors and/or camera(s) 180, which are hereinafter referred to as "camera(s) 180". Camera(s) 180 may convert an optical image into an electronic or digital image and may send captured images to processing unit(s) 150. In some embodiments, camera(s) 180 may include multiple cameras, front and/or rear facing cameras, wide-angle cameras, and may also incorporate CCD, CMOS, and/or other sensors. Camera(s) 180, which may be still and/or video cameras, may capture a series of 2-Dimensional (2D) still and/or video image frames of an environment and send the captured image frames to processing unit(s) 150. In some embodiments, camera(s) 180 may be a wearable camera, or an external camera, which may be operationally coupled to, but housed separately from, other functional units in UE 100. In some embodiments, camera(s) 180 may include multiple cameras, front and/or rear facing cameras, wide-angle cameras, and may also incorporate CCD, CMOS, and/or other sensors. In some embodiments, images captured by camera(s) 180 may be used to trigger Vision Based Positioning. For example, an image of a landmark or point of interest captured by camera(s) 180 in the vicinity of UE 100 may be used in conjunction with input from other sensors such as Inertial Measurement Unit 170 and/or an approximate location of UE 100 to refine a position estimate of UE 100.

In some embodiments, UE 100 may include Inertial Measurement Unit (IMU) 170. In some embodiments, IMU 170, which may comprise 3 axis accelerometer(s), 3-axis gyroscope(s), and/or magnetometer(s), may provide velocity, orientation, and/or other position related information to processing unit(s) 150. In some embodiments, IMU 170 may be configured to measure and output measured information synchronized to the capture of each image frame by camera(s) 180, and/or measurements taken by sensors 185 in UE 100. In some embodiments, the output of IMU 170 may be used by processing unit(s) 150 to determine a position and orientation UE 100. For example, when wireless signal based positioning is unavailable, measurements by IMU 170 may be used from a preceding reliable position estimate to estimate a current location of UE 100.

Processing unit(s) 150 may be implemented using a combination of hardware, firmware, and software. In some embodiments, processing unit(s) 150 may include Position Determination Module (PDM) 152, Proximity Module 154, and Location Assistance Data Module (LADM) 156.

Positioning Determination Module 152 (hereinafter PDM 152) may use information derived from sensor and wireless measurements by UE 100 either independently, or in conjunction with received location assistance data to determine a position estimate for UE 100. Position determination may be performed using a variety of well-known techniques including Satellite Positioning System (SPS) based positioning, Observed Time Difference of Arrival (OTDOA), Reference Signal Time Difference (RSTD), Advanced Forward Link Trilateralation (AFLT), hybrid SPS-AFLT techniques, Wireless Local Area Network (WLAN) based positioning, hybrid IMU-wireless techniques, etc. In some embodiments, receiver 114 on UE 100 may receive location assistance information, which may be processed by LADM 156 and provided to PDM 154.

LADM 156 may process may process location assistance information including information to assist wireless signal acquisition. The location assistance information may be used to perform SPS/Advanced Forward Link Trilateration (AFLT)/hybrid-AFLT/Received Signal Strength Indicator (RSSI)/Reference Signal Time Difference (RSTD)/OTDOA based position determination. In some embodiments, location assistance information may include wireless measurement assistance information, multipath information, OTDOA assistance information, including Positioning Reference Signal (PRS) assistance information, PRS timing pattern and/or muting information, etc. The assistance information may be sent to PDM 152 on processing unit(s) 150 to select a signal acquisition/measurement strategy and/or determine an initial location. In some embodiments, LADM 156 on processing unit(s) 150 may also be capable of processing various other received signals such as Long Term Evolution (LTE) Positioning Protocol (LPP) or LPP extensions (LPPe) messages including assistance information either directly and/or in conjunction with one or more other functional blocks shown in FIG. 1.

Proximity Module 154 may determine the proximity of one or more devices that may be associated with UE 100. For example, proximity module 154 may determine the proximity of an associated device based on: (i) the presence of a communicative coupling over a Wireless Personal Area Network (WPAN) with the associated device; and/or (ii) measurements of WPAN signal strength for WPAN signals received from the associated device.

The modules and methodologies described herein may be implemented by various means depending upon the application. For example, these modules and methodologies may be implemented in hardware, firmware, software, or any combination thereof. For example, for a hardware implementation, the processing unit(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. One or more of PDM 152, LADM 156 and/or proximity module 154 may be implemented using hardware (e.g. using functionality provided by an ASIC in processing unit(s) 150), software running on processing unit(s) 150, and/or firmware or stored in memory 130, or some combination thereof.

For a firmware and/or software implementation, the methodologies may be implemented using program code, microcode, procedures, functions, and so on that perform the functions described herein. Any machine-readable medium tangibly embodying instructions may be used in implementing the methodologies described herein. For example, program code may be stored in a non-transitory computer-readable medium 160 or memory 130 that is connected to and executed by processing unit(s) 150.

Memory may be implemented within processing unit(s) 150 or external to processing unit(s) 150. As used herein the term "memory" refers to any type of long term, short term, volatile, nonvolatile, or other memory and is not to be limited to any particular type of memory or number of memories, or type of media upon which memory is stored. In some embodiments, memory 130 may hold program code that facilitates position location, proximity determination and/or performance of other functions by UE 100. For example, memory 130 may hold data, program results, as well as data provided by IMU 170, various sensors 185.

In some embodiments, memory 130 comprise databases 135, which may hold information pertaining to associations of two or more UEs and configuration information pertaining to the association, functional capability information for associated UEs 100 including information to support processing by proximity module 154. For example, memory 130 and/or databases 135 may hold information about position location capability (e.g. whether SPS, WLAN, IMU and/or vision based positioning) is available on UE 100 and/or one or more devices associated with UE 100.

If implemented in firmware and/or software, the functions may be stored as one or more instructions or program code on a computer-readable medium, such as medium 160 and/or memory 130. Examples include computer-readable media encoded with computer programs and data associated with or used by the program. For example, the computer-readable medium including program code stored thereon may include program code to support hybrid photo mapping and navigation in a manner consistent with disclosed embodiments. The code may further support SPS/Advanced Forward Link Trilateration (AFLT)/hybrid-AFLT/Received Signal Strength Indicator (RSSI)/Reference Signal Time Difference (RSTD)/OTDOA measurement and positioning, in part, by using location assistance information.

Computer-readable medium 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 160, instructions and/or data may be provided as signals on transmission media included in a communication apparatus. For example, a communication apparatus may include a transceiver 110, which may receive signals through receiver 114 indicative of instructions and data. The instructions and data may cause one or more processors to implement SPS/AFLT/hybrid-AFLT/RSTD/OTDOA measurement and positioning, and/or other functions outlined herein. That is, the communication apparatus includes transmission media with signals indicative of information to perform disclosed functions.

Memory 130 may represent any data storage mechanism. Memory 130 may include, for example, a primary memory and/or a secondary memory. Primary memory may include, for example, a random access memory, read only memory, etc. While illustrated in this example as being separate from processing unit(s) 150, it should be understood that all or part of a primary memory may be provided within or otherwise co-located/coupled with processing unit(s) 150. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 160. As such, in certain example implementations, the methods and/or apparatuses presented herein may take the form in whole or part of a computer-readable medium 160 that may include computer implementable instructions stored thereon, which when executed by at least one processing unit(s) 150 may be operatively enabled to perform all or portions of the example operations as described herein. Computer readable medium 160 may be a part of memory 130.

Further, UE 100 may include a screen or display 190 capable of rendering color images, including 3D images. In some embodiments, display 190 may be used to display live images captured by camera(s) 180, Graphical User Interfaces (GUIs), program output, etc. In some embodiments, display 190 may comprise and/or be housed with a touchscreen to permit users to input data via some combination of virtual keyboards, icons, menus, or other Graphical User Interfaces (GUIs), user gestures and/or input devices such as a stylus and other writing implements. In some embodiments, display 190 may be implemented using a Liquid Crystal Display (LCD) display or a Light Emitting Diode (LED) display, such as an Organic LED (OLED) display. In other embodiments, display 190 may be a wearable display or a heads-up display, which may be operationally coupled to camera 180, processing unit(s) 150, and/or other functional units in UE 100.

Figure 2:
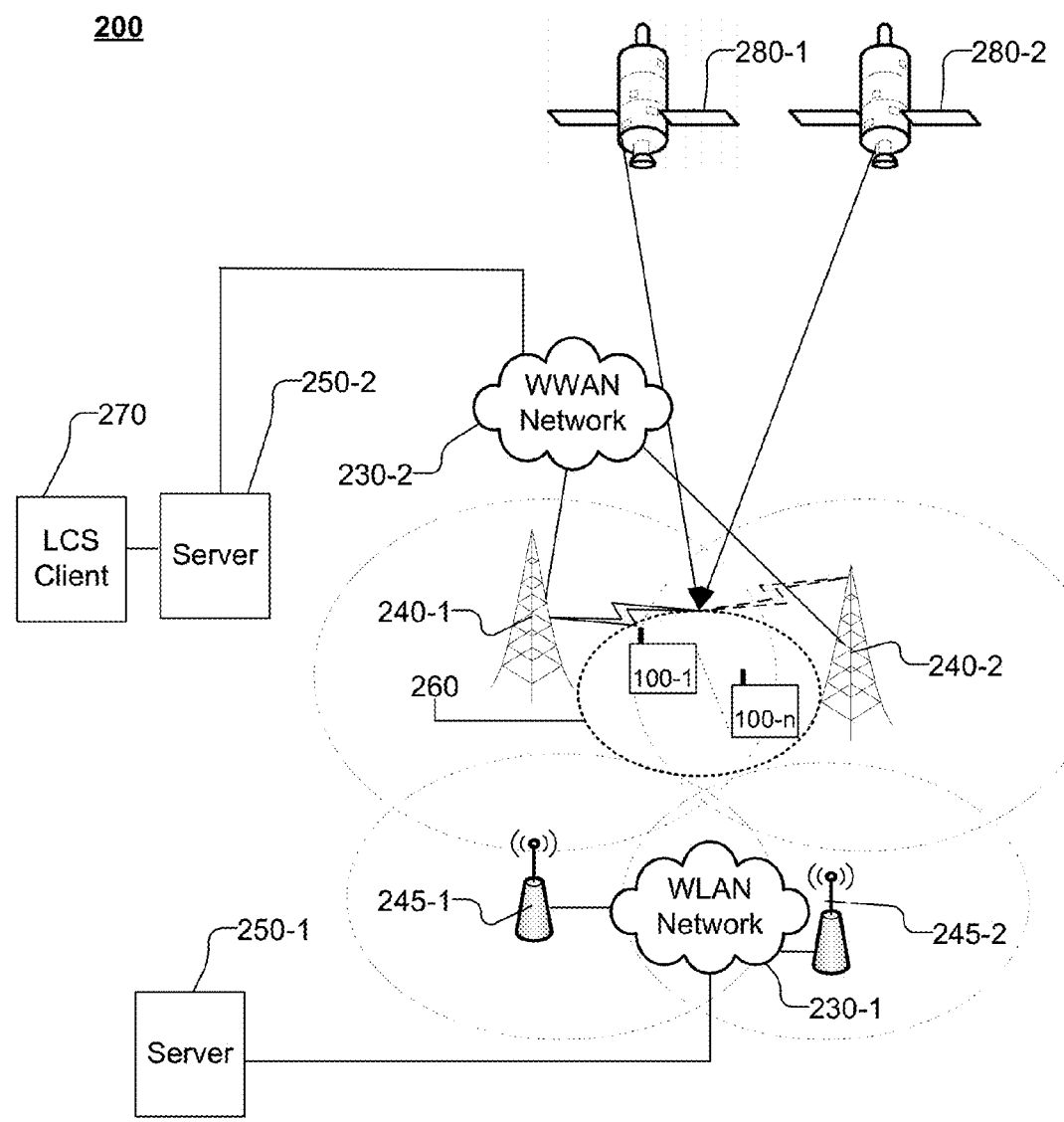
FIG. 2 shows an architecture of a system 200 capable of supporting proximity based device usage and/or providing Location Services to UEs in accordance with certain embodiments presented herein.

FIG. 2 shows an architecture of a system 200 capable of supporting proximity based device usage in accordance with certain embodiments presented herein. In some embodiments, system 200 may provide Location Services to UEs. Location services may include the transfer of location assistance data or location information, using messages such as Long Term Evolution (LTE) Positioning Protocol (LPP) or LPP extensions (LPPe) messages between UEs 100-$i$ ($1 \le i \le n$) and server 150, which, in some instances, may take the form of a location server or another network entity. The transfer of the location information may occur at a rate appropriate to both UEs 100-$i$ and servers 250-1 and/or 250-2 (collectively referred to as servers 250). The LPP Protocol is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

System 200 shows antennas 240-1 and 240-2 (collectively referred to as antennas 240) and Access Points (APs) 245-1 and 245-2 (collectively referred to as APs 245), which may in communication with a set 260 of n proximate UEs 100-1 through 100-$n$, where n≥2. Antennas 240 may be coupled to server 250-2 through Wireless Wide Area Network (WWAN) 230-2, while APs 245 may be coupled to server 250-1 through Wireless Local Area Network (WLAN) 230-1. Networks 230-1 and 230-2 are collectively referred to as networks 230. In addition, UEs in set 260 may be communicatively coupled using a WPAN (not shown in FIG. 2). In some embodiments, the communicative coupling of a first UE 100-1 with one or more other UEs or devices (e.g. over a WPAN) may be used as an indication of their proximity to each other. For simplicity, only two servers 250 are shown in FIG. 2. In general, system 200 may comprise multiple cells with additional networks 230, multiple UEs 100, various other devices coupled to one or more of networks 230-1 and/or 230-2, servers 250, antennas 240, APs 245, and Space Vehicles (SVs) 180.

One or more UEs 100 may be capable of wirelessly communicating with servers 250 through one or more networks 230 that support positioning and location services, which may include but is not limited to the Secure User Plane Location (SUPL) location solution defined by OMA and the Control Plane location solution defined by 3GPP for use with an LTE serving network. For example, Location services (LCS) may be performed on behalf of LCS Client 270 that accesses server 250-2 (which may take the form of a location server) and issues a request for the location of UE 100. Server 250-2 may then respond to LCS client 270 with a location estimate for UE 100. LCS Client 270 may also be known as a SUPL Agent—e.g. when the location solution used by server 250 and UE 100 is SUPL. In some embodiments, UE 100 may also include an LCS Client or a SUPL agent (not shown in FIG. 2) that may issue a location request to some positioning capable function within UE 100 and later receive a location estimate for UE 100. The LCS Client or SUPL Agent within UE 100 may perform location services for the user of UE 100—e.g. provide navigation directions or identify points of interest in the vicinity of UE 100.

Server 250-2 as used herein may be a SUPL Location Platform (SLP), an evolved Serving Mobile Location Center (eSMLC), a Serving Mobile Location Center (SMLC), a Gateway Mobile Location Center (GMLC), a Position Determining Entity (PDE), a Standalone SMLC (SAS), and/or the like.

As illustrated in FIG. 2, UE 100 may communicate with server 250-2 through network 230-2 and antennas 240, which may be associated with network 230-2. UE 100 may receive and measure signals from antennas 240, which may be used for position determination. In some embodiments, antennas 240 may form part of a wireless communication network, which may be a wireless wide area network (WWAN). A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available.

As illustrated in FIG. 2, UE 100 may also communicate with server 250-1 through network 230-1 and APs 245, which may be associated with network 230-1. UE 100 may receive and measure signals from APs 245, which may be used for position determination. In some embodiments, APs 245 may form part of a wireless communication network 230-1, which may be a wireless local area network (WLAN). For example, a WLAN may be an IEEE 802.11x network.

Further, set 260 of proximate UEs 100-1 through 100-*n*, may be communicatively coupled over a WPAN (not shown in FIG. 2). A WPAN may be a network based on the IEEE 802.15x standards, or some other type of network. For example, a WPAN may take the form of a Bluetooth, Infrared, and/or Near Field Communication (NFC) network.

The techniques may also be implemented in conjunction with other combinations of WWAN, WLAN and/or WPAN. For example, antennas 240 and network 230-2 may form part of, e.g., an evolved UMTS Terrestrial Radio Access Network (E-UTRAN) (LTE) network, a W-CDMA UTRAN network, a GSM/EDGE Radio Access Network (GERAN), a 1×RTT network, an Evolution-Data Optimized (EvDO) network, a WiMax network or a WLAN.

UE 100 may also receive signals from one or more Earth orbiting Space Vehicles (SVs) 280-1 or 280-2 (collectively referred to as SVs 280), which may be part of a satellite positioning system (SPS). SVs 280, for example, may be in a constellation of Global Navigation Satellite System (GNSS) such as the US Global Positioning System (GPS), the European Galileo system, the Russian Glonass system or the Chinese Compass system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 3:
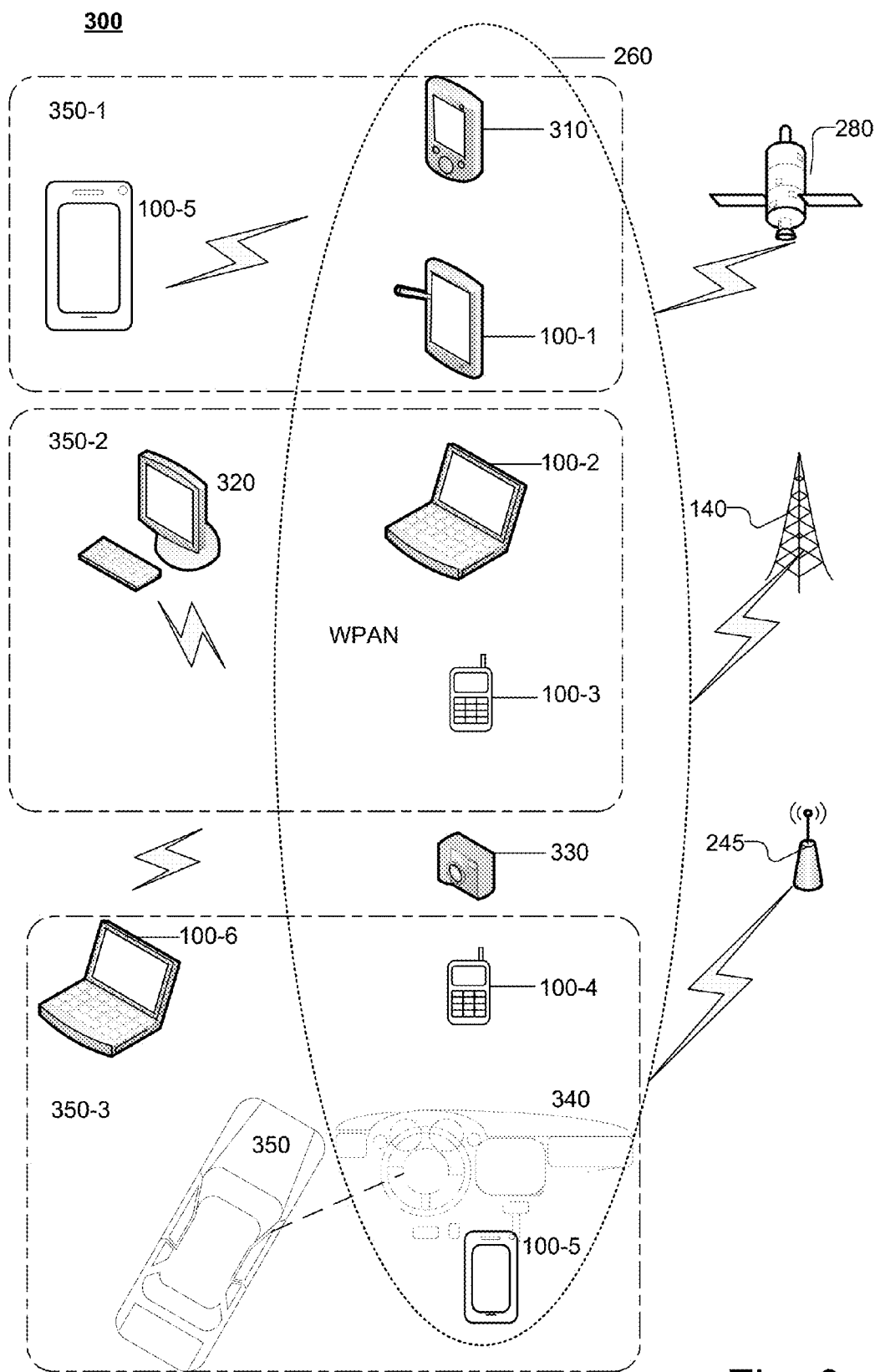
FIG. 3 shows a system 300 to facilitate proximity based device usage in accordance with certain embodiments presented herein.

FIG. 3 shows a system 300 comprising a plurality of devices, including UEs 100, wirelessly connected to one or more networks 230 (not shown in FIG. 3) in accordance with certain embodiments presented herein. For example, the devices in FIG. 3 may be connected to networks 230 through antennas 240 and/or APs 245 (not shown in FIG. 3). One or more devices shown in system 300 may also be coupled to a SPS through SVs 280. In describing FIG. 3, solely for explanatory reasons, the functions of one more devices shown in FIG. 3 have been specified.

FIG. 3 also shows set 260 of proximate devices that may be coupled wirelessly over a WPAN. For example, devices in set 260 may be coupled over one or more of a Bluetooth, NFC or infrared network. Set 260 (indicated in FIG. 3 by the dotted ellipse) of proximate devices may include UEs 100-1 through 100-5, GPS receiver 310, digital camera 330, and a vehicle tracking/navigation system 340.

As shown in FIG. 3, system 300 may also include device 100-5, computer 320 and laptop 100-6, which are not proximate to the devices in set 260. Further, system 300 includes three sets (shown by dashed rectangles) of associated devices 350-1, 350-2 and 350-3. Set 350-1 includes associated devices 100-5, 310 and 100-1; while set 350-2 includes associated devices 100-2, 100-3; and set 350-3 includes associated devices 100-4, 100-5, 100-6 and 340. Digital camera 330 is not associated with any other device shown in FIG. 300.

In some embodiments, the devices in set 350-1 may be associated with each other using an application available on the devices. For example, proximity module 154 may detect proximity and establish associations between one or more devices. A similar method may be used to associate the devices in sets 350-2 and 350-3, respectively. In some embodiments, proximity module 154 may report the proximity of associated devices to server 250.

In another embodiment, devices in set 350-1 may be associated by registering with a server (e.g. servers 250-1 and/or 250-2 in FIG. 2). For example, proximity module 154 may register one or more proximate UEs with a server by providing identification information to the server to associate one or more devices.

In some embodiments, the associations may be dynamic, so that upon detection of a proximate device that is appropriately enabled, the devices may be associated for the duration that they are proximate and/or for a session associated with the performance of some function. For example, proximity module 154 on a device such as UE 100 may be configured to permit association with any other device that requests association.

In another embodiment, proximity module 154 may provide or use a protocol between two devices such as UEs 100-4 and 100-5 to associate the devices. For example, proximity module 154 on UEs 100-4 and 100-5 may detect a unique key associated with a user or an association application on both devices and form an association based on the key.

In general, a user, manufacturer, application provider, or service provider may configure UEs 100 and/or other devices to facilitate association based on various parameters, including privacy, user preferences, emergency considerations, and/or in conformance with any locally applicable laws.

As shown in FIG. 3 by set 260 (dotted ellipse) in associated set of devices 350-3, UE 100-4, position/navigation system 340 and UE 100-5 are proximate. Similarly, in associated set of devices 350-2, UEs 100-2 and 100-3 are proximate. Further, in associated set of devices 350-1, UE 100-1 and GPS device 310 are proximate. Although devices 100-5, 350-2 and 100-6 may be active and communicating wirelessly, they may not be considered proximate by proximity module 154 because they are not associated with respective associated devices through a WPAN. Conversely, UE 100-1 may be proximate to UE 100-2 (e.g. communicatively coupled to UE 100-2 through a WPAN), but may not be associated with UE 100-2.

In some embodiments, when a set of devices such as UEs 100 are associated with each other, proximity module 154 or another application may provide capability information for each device to a server 250, and/or to other associated devices. In some embodiments, the capability information may be provided at the time of association and/or at the time of registration/association with servers 250. For example, the capability information may include a mapping of devices to positioning capabilities (SPS, AFLT, IMU-based, VBP etc) available on that device.

In some embodiments, based on the capability information, when a function is unavailable on one associated proximate device (e.g. UE 100-4), then performance of the function may be delegated to another proximate associated device (e.g. UE 100-5) that possesses the desired functionality. For example, if UE 100-4 and 100-5 are both registered with server 250-2, then, if server 250-2 determines that UE 100-4 is unavailable for location determination, then, based on a reported or determined proximity of UE's 100-4 and 100-5, and a prior association of UE 100-4 and 100-5, server 250 may: (i) direct the location determination request to UE 100-5, and/or (ii) provide a recently determined or current location estimate associated with UE 100-5 as a proxy for the location of UE 100-4.

In some embodiments, proximity module 154 on a UE 100 may be configured to obtain the functions or capabilities available on each UE 100 when the UEs are associated. The capabilities may be directly exchanged between the UEs using an agreed upon protocol and/or provided to a server. In some embodiments, the server may provide the capabilities of registered UEs to other associated UEs. Thus, when associated UEs 100 are proximate, desired functions may be distributed among the proximate associated UEs 100 based on capabilities of the respective UEs. In some embodiments, the results obtained from performing a function by a proxy UE may be associated with: (i) the UE to which the request to perform the function was originally directed and/or (ii) the proxy UE, which performed the function.

As another example, a user may configure proximity module 154 to disable position determination functionality when devices UE 100-5 and position/navigation system 350 in vehicle 340 are proximate (e.g. when connected by Bluetooth) Accordingly, in one embodiment, any position determination requests directed to UE 100-5 may be routed to position/navigation system 350, which may report or obtain its current position and report the position as a proxy for the location of UE 100-5. In some embodiments, the position determination request may be forwarded to position/navigation system 350 by UE 100-5 and reported back to server 250-2 by UE 100-5. In another embodiment, for example, when UE 100-5 and position/navigation system 350 are registered with server 250-2, position/navigation system 350 may respond to the position determination request directly. In another embodiment, the proximity of associated devices UE 100-5 and position/navigation system 350 may be available to server 250-2, which may also obtain configuration information related to the unavailability of UE 100-5 for position determination operations during a period when UE 100-5 is proximate to position/navigation system 350. Accordingly, in the example above, server 250-2 may communicate directly with position/navigation system 350 to obtain location information of position/navigation system 350 as a proxy for the location of UE 100-5.

Further, in some embodiments, a plurality of location determination techniques may be used to determine location. For example, position/navigation system 350 may use an SPS (e.g. GNSS based) positioning, WWAN based positioning, WLAN) based positioning, and/or a hybrid positioning scheme. For example, IMU based positioning may be used to determine a current position of a proximate associated UE 100-5 and the current position may be based on a previously determined position using position/navigation system 350, if the prior position was determined within some time window of the current time. The time window may be varied depending on the accuracy desired or the accuracy of the IMU. As another example, position/navigation system 350 may receive a position determination request for UE 100-5 over a WWAN but may determine its position using SPS and report the position of position/navigation system 350 as a proxy for the position of proximate associated UE 100-5 over the WWAN. Thus, battery power and various other resources may be conserved by UE 100-5.

Figure 4:
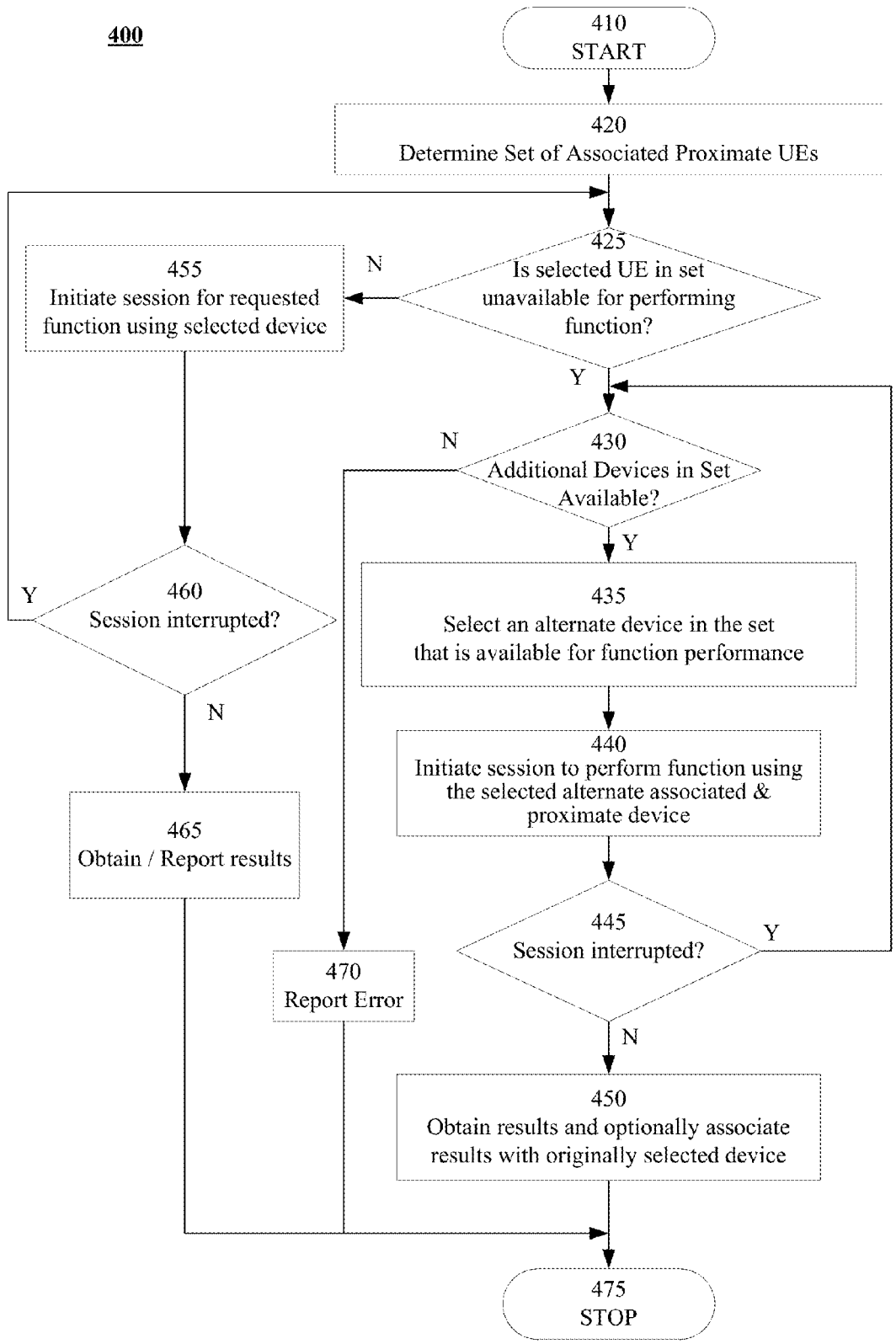
FIG. 4 shows a flowchart of an exemplary method 400 for proximity based proxy device usage in accordance with certain embodiments presented herein.

FIG. 4 shows a flowchart of an exemplary method 400 to support proximity based proxy device usage in accordance with certain embodiments presented herein. In some embodiments, method 400 may be performed by one or more of UEs 100 and/or servers 250. In some embodiments, method 400 may be performed, at least in part, by proximity module 154.

After commencing in block 410, a set of proximate and associated UEs 100 may be obtained in block 420. For example, the set of UEs 100 may have been previously associated and registered with a server 250 and their proximity may be determined based on their association over a WPAN.

In some embodiments, one or more UEs 100 may dynamically associate when proximate based on configuration parameters associated with the respective UEs. In another embodiment, a first UE 100-i may be deemed as proximate to a second associated UE 100-j (i≠j), based on a prior position determination of the first UE and a prior position determination of the second UE, if the prior position determination of the first UE and the prior position determination of the second UE occurred within some specified time window of a current time and if distance between the first and second UE (as estimated based on the prior position determinations) was below some threshold proximity distance. For example, if prior position determinations (within the time window) indicated that the distance between the first and second associated UEs was below some threshold proximity, then the first UE 100-i may be deemed as proximate to the second associated UE 100-j (i≠j). In some embodiments, the set of associated proximate UEs may be periodically updated based on whether one or more UEs are no longer communicatively coupled over a WPAN.

In block 425, a determination is made whether the first/next selected UE 100-i in the set of associated devices is available to perform a desired function. If the selected UE 100-i is available ("N" in block 425), then, in block 455, a session to perform the desired function may be initiated using selected UE 100-i. In block 460, if the session when the function is being performed by selected UE 100-i is interrupted ("Y" in block 460), then another iteration is commenced in block 425. On the other hand, if the session proceeds to completion ("N" in block 460), then, in block 465, the results obtained may be reported. For example, if the desired function was position determination, then, the position of selected DE 100-i may be reported.

In block 425, if selected UE 100-i is unavailable ("Y" in block 425) to perform the requested function, then, in block 430, the availability of at least one alternate associated proximate UE 100-j (i≠j) in the set may be determined. If at least one alternate associated proximate UE 100-j is available in the set of associated devices proximate to the selected UE 100-i ("Y" in block 430), then, in block 435, at least one available alternate associated proximate UE 100-j from the set is selected. In block 440, a session to perform the requested function is initiated using UE 100-j. For example, if the desired function was position determination originally directed to UE 100-i and associated proximate DE 100-j was selected to perform the function, then, a position determination session may be initiated using UE 100-*j*.

In block 445, if the session when the function is being performed by newly selected UE 100-*j* is interrupted ("Y" in block 445), then another iteration is commenced in block 425. On the other hand, if the session proceeds to completion ("N" in block 445), then, in block 450, the results obtained may be reported. In some embodiments, the results obtained by UE 100-*j* may be optionally associated with: (i) originally selected DE 100-*i* to which the original request was directed and/or (ii) the proxy UE 100-*j* that performed the function. For example, if the desired function was a position determination request, the position of proxy UE 100-*j* through which the position determination was performed may be associated with: (i) proxy UE 100-*i* and/or (ii) proxy UE 100-*j*.

As another example, a user may enter a mall and may have specified a first UE such as a tablet computer to perform a location determination function and a second associated proximate UE such as a mobile phone to receive advertisements or offers from stores in the mall. For example, the user may have registered both the tablet and the mobile phone with a server associated with a wireless service provider. The user may have placed the tablet computer in a backpack while hand carrying the phone. Accordingly, when the service provider detects that the associated devices tablet and mobile phone are proximate, the service provider may send location requests to the tablet instead of the mobile phone, and direct the sending of advertising messages based on the location of the tablet, to the mobile phone. The mobile phone and/or tablet may report their proximity to the service provider server because they are associated via a Bluetooth (or other WPAN) connection. Accordingly, if the service provider server detects that the tablet computer is near a shoe store in the mall, advertising messages for the shoe store may be sent to the mobile phone using the location of the tablet computer as a proxy for the location of the associated and proximate mobile phone.

In general, a variety of functions may be divided or distributed between one or more associated proximate devices based on one or more of: a priority scheme associated with the devices, a mapping of devices to functions, capabilities associated with the devices, wireless signals available to the devices, wireless signal characteristics seen by the devices, available battery capacity on each device, etc.

For example, as one example of a priority scheme, a user may specify an order of associated proximate devices for performance of a function. For example, when a UE 100 is associated with and proximate to navigation system in a vehicle and tablet computer, UE 100 may indicate that all location determination requests should be proxied first to the vehicle navigation system and then to the tablet computer, when position determination requests are proxied.

In another embodiment, each associated proximate device may be mapped to one or more functions and requests to perform a function may be routed appropriately. For example, when a UE 100 is associated with and proximate to navigation system in a vehicle and mobile phone, UE 100 may indicate that location determination requests should be proxied to the vehicle navigation system, while advertising messages related to position should be proxied to the mobile phone, when the requests are proxied.

As another example, computationally intensive requests to a UE may be proxied to an associated proximate laptop computer (for example, any image processing when using vision based positioning) based on available processing capability, but advertising messages to the UE based on location may be proxied to a mobile phone. Various other schemes for proxying requests to associated proximate UEs are envisaged.

In block 430, if no alternate associated proximate device is available in the set of associated devices proximate to selected UE 100-*i* ("N" in block 430), then, in block 470, an error or other exception may be reported prior to termination in block 475.

Figure 5:
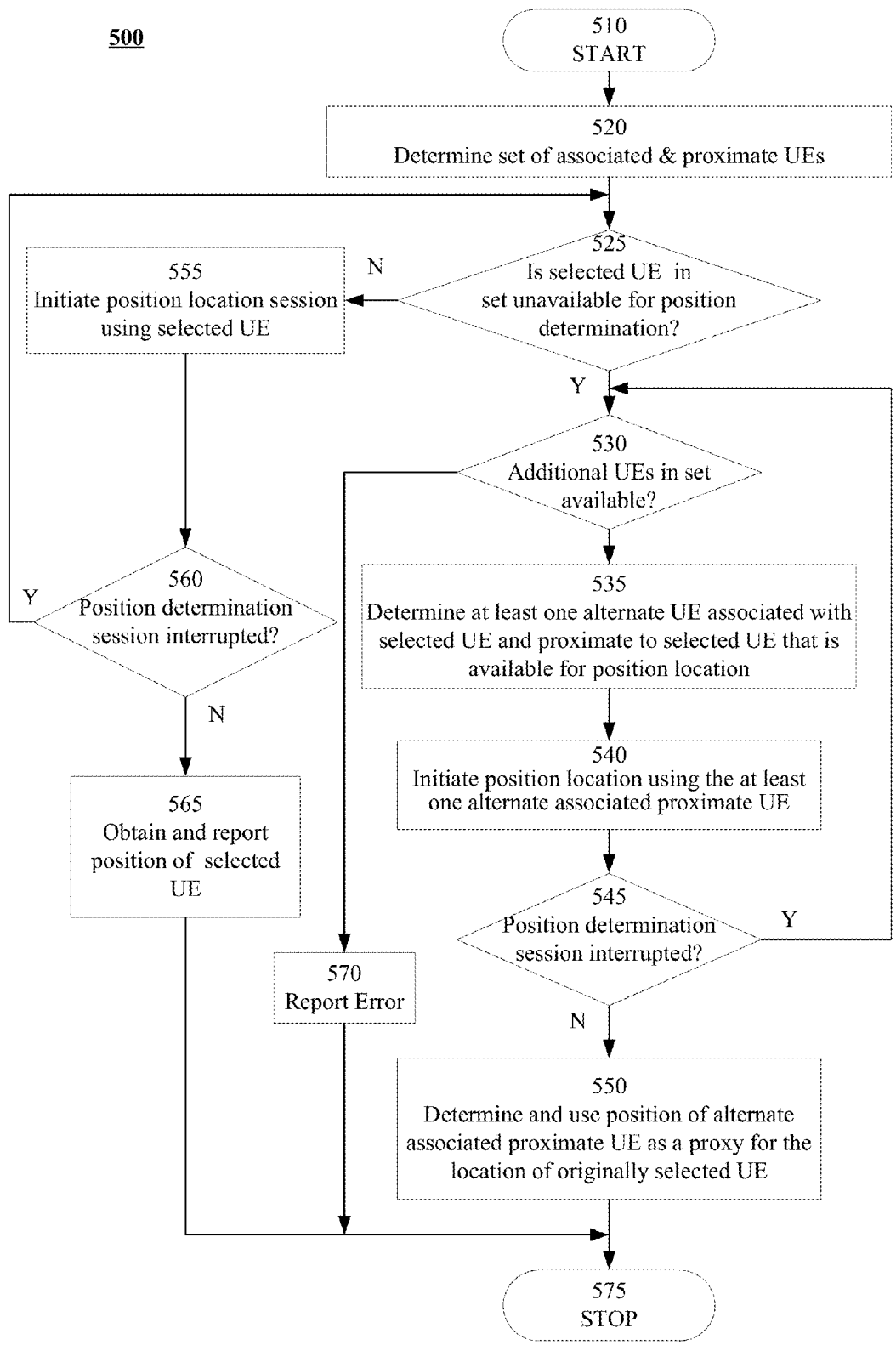
FIG. 5 shows a flowchart of an exemplary method 500 for position determination using associated proximate proxy devices in accordance with certain embodiments presented herein.

FIG. 5 shows a flowchart of an exemplary method 500 for position determination using associated proximate proxy devices in accordance with certain embodiments presented herein. In some embodiments, method 500 may be performed by one or more of UEs 100 and/or servers 250. In some embodiments, method 500 may be performed, at least in part, by processing unit(s) 150 and/or proximity module 154.

After commencing in block 510, a set of proximate and associated UEs may be obtained in block 520. For example, the set of UEs 100 may have been previously associated and registered with a server 250 and their proximity may be determined based on their association over a WPAN. In some embodiments, one or more UEs 100 may dynamically associate when proximate based on configuration parameters associated with the respective UEs. In another embodiment, as outlined above, a first UE 100-*i* may be deemed as proximate to a second associated UE 100-*j* (i≠ j), based on a prior position determination of the first UE and a prior position determination of the second UE, if the prior position determination of the first UE and the prior position determination of the second UE occurred within a specified time window of a current time and if distance between the first and second UE (as estimated based on the prior position determinations) was below some threshold proximity distance.

In block 525, a determination is made whether the first/next selected UE 100-*i* in the set of associated proximate devices is available to perform position determination. If selected UE 100-*i* is available ("N" in block 525), then, in block 555, a session to perform the position determination may be initiated using selected UE 100-*i*.

In block 560, if the position determination session by selected UE 100-*i* is interrupted ("Y" in block 460), then another iteration is commenced in block 525. For example, if a position determination session during an emergency call for selected UE 100-*i* is interrupted, then in block 425, an alternate associated proximate UE 100-*j* may be selected to continue the position determination session as a proxy for the position of originally selected DE 100-*i*.

On the other hand, if the position determination session initiated in block 455 by selected UE 100-*i* proceeds to completion ("N" in block 560), then, in block 565, the results obtained may be reported.

In block 525, if selected UE 100-*i* is unavailable ("Y" in block 525), then, in block 530, the availability of at least one alternate associated proximate UE 100-*j* (i≠j) in the set may be determined. If at least one alternate associated proximate UE 100-*j* is available to perform position determination in the set of associated devices proximate to selected DE 100-*i* ("Y" in block 530), then, in block 535, at least one alternate associated proximate UE 100-*j* from the set is selected. In block 540, a position determination session is initiated using UE 100-*j*.

In some embodiments, UE 100-*j* may use any available position location method based on its capabilities, signal availability and other factors. For example, if 100-*i* performed position determination using AFLT, but UE 100-*j* is SPS capable, then, UE 100-*j* may determine its position using SPS. As another example, UE 100-*j* may report a recently determined position instead of initiating a new position determination session. For example, if the position determination was made within some time window, then UE 100-*j* may report the previously determined position. In some embodiments, UE 100-*j* may be selected for the proxy position determination because of a recent history of position determination. In some embodiments, any position determined by a UE may be shared with associated proximate devices.

In block 545, if the position determination session being performed by the newly selected UE 100-*j* is interrupted ("Y" in block 545), then another iteration is commenced in block 525, where another associated proximate UE may be selected. On the other hand, if the session proceeds to completion ("N" in block 445), then, in block 450, the position determined by UE 100-*j* may be reported. In some embodiments, the position determined by UE 100-*j* may be optionally associated with the UE 100-*i* to which the original request was directed.

As a further example, when a UE 100 is associated with and proximate to a laptop computer with only WLAN based positioning functionality, a mobile device with SPS/ALFT based functionality, when proxied, position determination requests may first be directed to the mobile device when the UE is outdoors, but directed to the laptop computer when the UE is indoors. For example, the availability of SPS signals may be used to determine if the UE is outdoors or indoors. In some embodiments, position determination request may be proxied to an associated proximate device based on one or more of: wireless signal quality, time needed for position determination, and/or a recent history of position determination. For example, if one of the associated proximate devices recently performed a position determination request, then any proxied position determination requests may be sent to that device.

In general, the selection of alternate associated proximate UE 100-*j* may be based on a variety of factors, including a priority scheme or device order specified by the user, the positioning capabilities of alternate associated proximate DE 100-*j*, wireless signal strength (e.g. based on a Received Signal Strength Indicator (RSSI)), number of APs, satellites, or base stations visible to UE 100-*j*, available battery capacity, cost considerations, and/or a recent history of position determination. For example, if GPS positioning capability is available on a tablet computer at no cost, but incurs a cost when used on an associated proximate mobile phone, location determination requests, when proxied, may be sent to the tablet computer.

In block 530, if no alternate associated proximate device is available in the set of associated devices proximate to the selected UE ("N" in block 530), then, in block 570, an error or other exception may be reported prior to termination in block 575.

Figure 6:
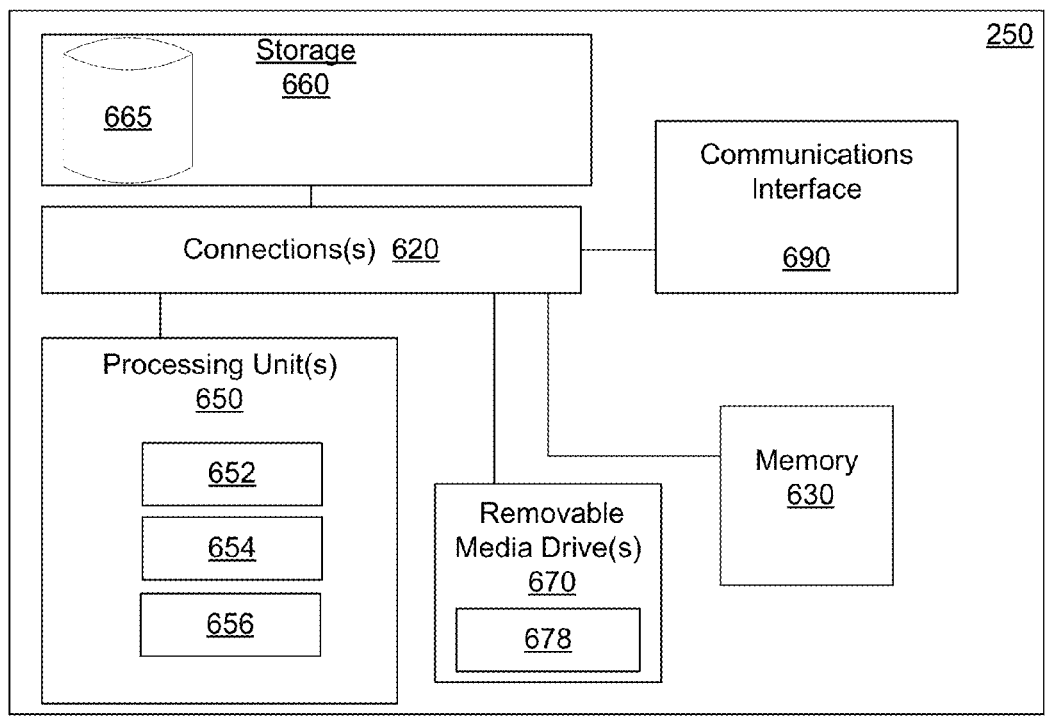
FIG. 6, which is a schematic block diagram illustrating a server 250 to support proximity based device usage in accordance with certain embodiments presented herein.

Reference is now made to FIG. 6, which is a schematic block diagram illustrating a server 250 to support proximity based proxy device usage in accordance with certain embodiments presented herein. In some embodiments, server 250 may include, for example, one or more processing units 650, memory 630, storage 660, and (as applicable) communications interface 690 (e.g., wireline or wireless network interface), which may be operatively coupled with one or more connections 620 (e.g., buses, lines, fibers, links, etc.). In certain example implementations, some portion of server 250 may take the form of a chipset, and/or the like.

Communications interface 690 may include a variety of wired and wireless connections that support wired transmission and/or reception and, if desired, may additionally or alternatively support transmission and reception of one or more signals over one or more types of wireless communication networks. Communications interface 690 may also include interfaces for communication with various other computers and peripherals. For example, in one embodiment, communications interface 690 may comprise network interface cards, input-output cards, chips and/or ASICs that implement one or more of the communication functions performed by server 250. In some embodiments, communications interface 690 may also interface with networks 230 (not shown in FIG. 6) to obtain a variety of network configuration related information, such as Physical Cell Identities, (PCIs), configured PRS information, and/or timing information used by the base stations in the network. For example, communications interface 690 may make use of the LPP annex (LPPa) protocol defined in 3GPP TS 36.455 or a modification of this protocol to obtain PCI, configured PRS, timing and/or other information from the base stations in network 230. Processing unit 650 may use some or all of the received information to generate OTDOA and other location assistance data information in a manner consistent with disclosed embodiments.

Processing unit(s) 650 may be implemented using a combination of hardware, firmware, and software. In some embodiments, processing unit 650 may include server Position Determination Module (PDM) 652, Proximity Module 654, and Location Assistance Data Module (LADM) 656.

Position Determination Module (PDM) 654 may use information derived from received sensor and wireless measurements (e.g. provided by a UE 100 communicatively coupled to server 250) to determine the position of UE 100. For example, the UE may provide wireless measurement to server 250, which may use PDM 654 and data from a Base Station Almanac (BSA) to determine a position of the UE 100 and report the position of the UE to LCS Client 270 and/or to UE 100. PDM 654 may be capable of position determination based on a variety UE measurements including OTDOA, RSTD, RSSI, AFLT, hybrid SPS-AFLT techniques, and/or UE measurements of signals from APs 245.

In some embodiments, server location assistance data module (LADM) 656 may retrieve information from BSA and other sources and provided location assistance information to UE 100. The provided information may be used by UE 100 to estimate an initial location or prefix and/or used to acquire and/or measure wireless signals. LADM 656 may provide location assistance information comprising wireless measurement assistance information, multipath information, Observed Time Difference of Arrival (OTDOA) assistance information, including Positioning Reference Signal (PRS) assistance information, PRS timing pattern and/or muting information, etc. In some embodiments, processing unit 650 may generate the OTDOA assistance information as Long Term Evolution (LTE) Positioning Protocol (LPP) or LPP extensions (LPPe) messages. In some embodiments, processing unit(s) 650 may represent one or more circuits configurable to perform at least a portion of a data signal computing procedure or process related to the operation of server 250.

Server proximity module 654 may facilitate registration and association of UEs 100. In some embodiments, proximity module 654 may perform portions of methods 400 and/or 500. In some embodiments, proximity module 654 may receive and store proximity information pertaining to UEs 100. Proximity module 654 may query database 665 in storage 660, to determine associated devices. In some embodiments, based on configuration parameters in database 655, proximity module 654 may route location requests and/or requests to perform a desired function, originally intended for a selected UE 100-$i$ to one or more alternate associated proximate UEs 100-$j$ ($i \neq j$). In another embodiment, server 250 may detect interruption of an emergency call and/or a position location session and may route the location request to an alternate associated proximate UE 100-$j$ based on the configuration information. Proximity module may store and retrieve configuration information from database 655 including priority schemes associated with a set of associated UEs 100, a mapping of associated UEs 100 to functions, capabilities associated with a set of associated UEs 100, a recent history of position determination requests etc.

In some embodiments, proximity module 654 may determine that two associated devices UE 100-$i$ and UE 100-$j$ are proximate based on a prior position determination request associated with UE 100-$i$ (e.g. performed or obtained by PDM 652) and a prior position determination request associated with UE 100-$j$ (e.g. performed or obtained by PDM 652), if the position requests were within some specified time window and a distance between UE 100-$i$ and UE 100-$j$ based on the position determinations indicated that the UEs were within some proximity threshold.

The modules and methodologies described herein in may be implemented by various means depending upon the application. For example, these modules and methodologies may be implemented in hardware, firmware, software, or any combination thereof. For a hardware implementation, the processing unit 650 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. One or more of server PDM 652, LADM 656 and/or proximity module 654 may be implemented using hardware (e.g. using functionality provided by an ASIC in processing unit(s) 650), software running on processing unit(s) 650, and/or firmware or stored in memory 630, or some combination thereof.

For a firmware and/or software implementation, the methodologies may be implemented using procedures, functions, and so on that perform the functions described herein. Any machine-readable medium tangibly embodying instructions may be used in implementing the methodologies described herein. For example, software may be stored in removable media drive 670, which may support the use of non-transitory computer-readable media 678, including removable media. Program code may be resident on non-transitory computer readable media 678 or memory 630 and may be read and executed by processing units 650. Memory 630 may be implemented within processing units 650 or external to the processing units 650. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 678 and/or memory 630. Examples include computer-readable media encoded with a data structure and computer-readable media encoded with a computer program. For example, non-transitory computer-readable medium 678 including program code stored thereon may include program code to support proxy device usage in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 690, which may store the instructions/data in memory 630, storage 660 and/or relayed the instructions/data to processing units 650 for execution. For example, communications interface 690 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 630 may represent any data storage mechanism. Memory 630 may include, for example, a primary memory and/or a secondary memory. Primary memory may include, for example, a random access memory, read only memory, nonvolatile RAM, etc. While illustrated in this example as being separate from processing unit 650, it should be understood that all or part of a primary memory may be provided within or otherwise co-located/coupled with processing unit 650. Secondary memory may include, for example, the same or similar type of memory as primary memory and/or storage 660 such as one or more data storage devices including, for example, hard disk drives, optical disc drives, tape drives, a solid state memory drive, etc. In some embodiments, storage 660 may comprise one or more databases 665 that may hold information pertaining to various entities in system 200 and/or the broader cellular network. In some embodiments, information in the databases may be read, used and/or updated by processing units 650 during various computations, including storing capabilities of UEs 100, associations of UEs 100, proximity of associated UEs 100, generating location assistance data, computing locations of UE 100, etc.

In certain implementations, secondary memory may be operatively receptive of, or otherwise configurable to couple to a non-transitory computer-readable medium 678. As such, in certain example implementations, the methods and/or apparatuses presented herein may take the form in whole or part of a removable media drive 370 that may include non-transitory computer readable medium 678 with computer implementable instructions stored thereon, which if executed by at least one processing unit 650 may be operatively enabled to perform all or portions of the example operations including methods 400 and/or 500 as described herein. Computer readable medium 678 may be a part of memory 630.

Figure 7:
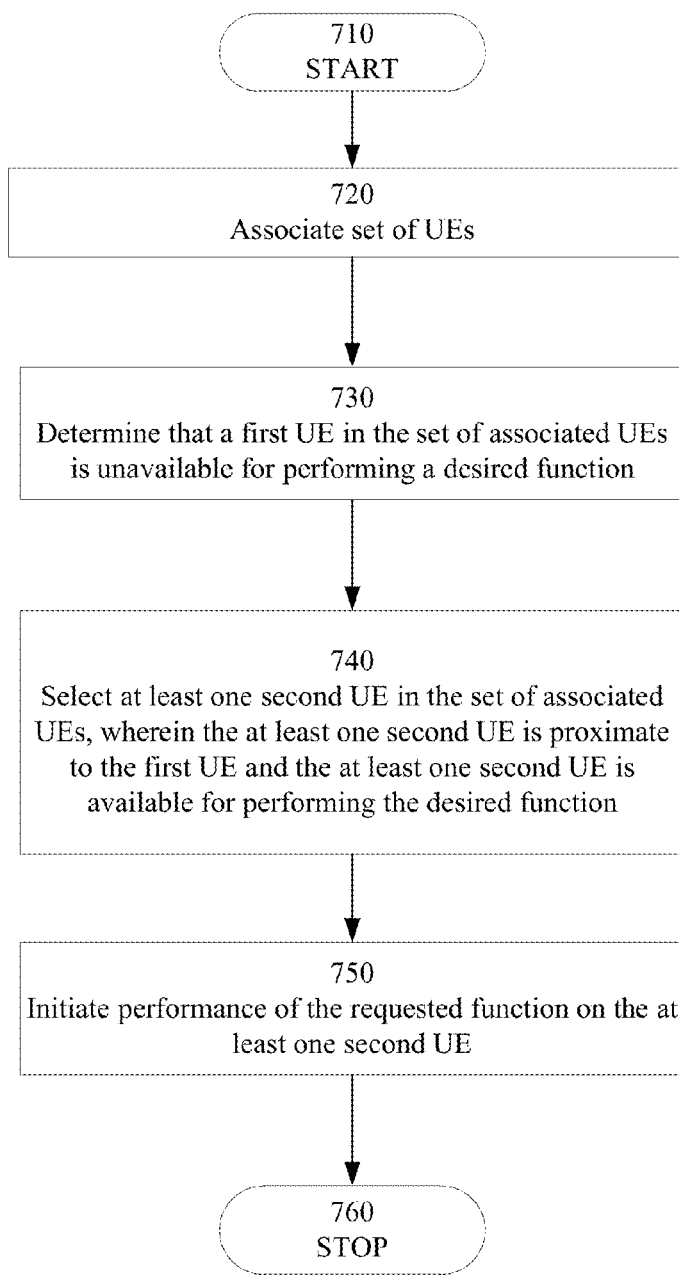
FIG. 7 shows a flowchart of an exemplary method 700 to facilitate proximity based proxy device usage in accordance with certain embodiments presented herein.

FIG. 7 shows a flowchart of an exemplary method 700 to facilitate proximity based proxy device usage in accordance with certain embodiments presented herein. In some embodiments, method 700 may be performed by UE 100 and/or server 250.

After commencing in block 710, in block 720, a set of UEs may be associated with each other.

In block 730, a determination that a first UE in the set is unavailable for performing a requested function may be made. For example, the requested function may be a determination of a position of the first UE.

In block 740, at least one second UE in the set of associated UEs may be selected, wherein the at least one second UE is proximate to the first UE and the at least one second UE is available for performing the requested function. For example, the at least one second UE may be selected upon determining that the at least one second UE and the first UE are communicatively coupled over a Wireless Personal Area Network. As another example, the at least one second UE may be selected by: determining proximity of the first UE and the at least one second UE based on a prior position determination of the first UE and a prior position determination of the at least one second UE, wherein the prior position determination of the first UE and the prior position determination of the at least one second UE occurred within a specified time window of current time. In some embodiments, the at least one second UE proximate to the first UE may be selected based on a priority scheme associated with the set of UEs. In some embodiments, the at least one second UE proximate to the first UE may be selected based on the availability of the requested function in the at least one second UE. In some embodiments, the at least one second UE proximate to the first UE may be selected based on a predefined allocation of the requested function to the at least one second UE.

In block 750, the performance of the requested function on the at least one second UE may be initiated. For example, if the requested function is position determination, then, position location on the at least one second UE may be initiated using at least one of a plurality of position location methods available on the at least one second UE. For example, position location may be initiated on the at least one second UE using one or more of: Global Navigation Satellite System (GNSS) positioning; or Wireless Wide Area Network (WWAN) based positioning; or Wireless Local Area Network (WLAN) based positioning; or Inertial Measurement Unit (IMU) based positioning based on a prior position of the at least one second UE, wherein the prior position of the at least one second UE was determined within a time window of current time. In some embodiments, the method may further comprise associating results of performing the requested function with the first UE.

Although the disclosure is illustrated in connection with specific embodiments for instructional purposes, embodiments are not limited thereto. Various adaptations and modifications may be made without departing from the scope. Therefore, the spirit and scope of the appended claims should not be limited to the foregoing description.

What is claimed is:

1. A method on a mobile device comprising:
   determining a set of user proximate equipments (UEs) that is associated with the mobile device;
   receiving a request to perform a position determination function and at least one distinct additional requested function;
   selecting a first UE in the set of associated proximate UEs that is available for performing the position determination function;
   selecting a second UE in the set of associated proximate UEs, wherein the second UE is available for performing the at least one distinct additional requested function; and
   initiating a performance of: the position determination function on the first UE, and, the at least one distinct additional requested function on the second UE.

2. The method of claim 1, further comprising:
   associating results of performing the position determination function with the mobile device.

3. The method of claim 1, wherein initiating the performance of the position determination function on the first UE comprises:
   initiating the performance of the position determination function on the first UE using at least one of a plurality of position location methods available on the first UE.

4. The method of claim 3, wherein the at least one of the plurality of position location methods available on the first UE comprises:
   Global Navigation Satellite System (GNSS) positioning; or
   Wireless Wide Area Network (WWAN) based positioning; or
   Wireless Local Area Network (WLAN) based positioning; or
   Inertial Measurement Unit (IMU) based positioning based on a prior position of the first UE, wherein the prior position of the first UE was determined within a time window of a current time; or
   some combination thereof.

5. The method of claim 1, wherein determining the set of associated proximate UEs comprises:
   determining that one or more associated UEs are proximate based on being communicatively coupled over a Wireless Personal Area Network.

6. The method of claim 1, wherein determining the set of associated proximate UEs comprises:
   determining proximity of the first UE and the second UE based on a prior position determination of the first UE and a prior position determination of the second UE, wherein the prior position determination of the first UE and the prior position determination of the second UE occurred within a specified time window of a current time.

7. The method of claim 1, wherein selecting the first UE and selecting the second UE in the set of associated proximate UEs further comprises:
   selecting the first UE based on mapping of the position determination function to UEs in the set of associated proximate UEs and select the second UE based on a mapping of the at least one distinct additional requested function to UEs in the set of associated proximate UEs.

8. The method of claim 1, wherein selecting the second UE in the set of associated proximate UEs further comprises:
   selecting the second UE based on an availability of the at least one distinct additional requested function on the second UE, wherein the at least one distinct additional requested function comprises the display of advertising information.

9. The method of claim 1, wherein selecting the second UE in the set of associated proximate UEs further comprises:
  selecting the second UE based on a predefined allocation of the at least one distinct additional requested function to the second UE.

10. A mobile device comprising:
  a transceiver; and
  a processor coupled to the transceiver, wherein the processor is configured to:
    determine a set of proximate user equipments (UEs) that is associated with the mobile device;
    receive a request to perform a position determination function and at least one distinct additional requested function;
    select a first UE in the set of associated proximate UEs, wherein the first UE is available for performing the position determination function;
    select a second UE in the set of associated proximate UEs, wherein the second UE is available for performing the at least one distinct additional requested function; and
    initiate, via the transceiver, a performance of: the position determination function on the first UE, and the at least one distinct additional requested function on the second UE.

11. The mobile device of claim 10, wherein the processor is further configured to:
  associate results of performing the position determination function with the mobile device.

12. The mobile device of claim 10, wherein, to initiate the performance of the position determination function on the first UE, the processor is configured to:
  initiate, via the transceiver, the performance of the position determination function on the first UE using at least one of a plurality of position location methods available on first UE.

13. The mobile device of claim 12, wherein the at least one of the plurality of position location methods available on the first UE comprises:
  Global Navigation Satellite System (GNSS) positioning; or
  Wireless Wide Area Network (WWAN) based positioning; or
  Wireless Local Area Network (WLAN) based positioning; or
  Inertial Measurement Unit (IMU) based positioning based on a prior position of the first UE, wherein the prior position of the first UE was determined within a time window of a current time; or
  some combination thereof.

14. The mobile device of claim 10, wherein to determine the set of associated proximate UEs, the processor is configured to:
  determine that one or more associated UEs are proximate based on being communicatively coupled over a Wireless Personal Area Network.

15. The mobile device of claim 10, wherein to determine the set of associated proximate UEs, the processor is configured to:
  determine proximity of the first UE and the second UE based on a prior position determination of the first UE and a prior position determination of the second UE, wherein the prior position determination of the first UE and the prior position determination of the second UE occurred within a specified time window of a current time.

16. The mobile device of claim 10, wherein the processor is configured to select the first UE based on a mapping of the position determination function to UEs in the set of associated proximate UEs and select the second UE based on a mapping of the at least one distinct additional requested function to UEs in the set of associated UEs.

17. The mobile device of claim 10, wherein the processor is configured to select the second UE in the set of associated proximate UEs based on an availability of the at least one distinct additional requested function on the second UE, wherein the at least one distinct additional requested function comprises the display of advertising information.

18. The mobile device of claim 10, wherein the processor is configured to select the second UE in the set of associated UEs based on a predefined allocation of the requested function to the at least one second UE.

19. A mobile device comprising:
  means for determining a set of UEs that is associated with the mobile device;
  means for receiving a request to perform a position determination function and at least one distinct additional requested function;
  means for a first UE in the set of associated UEs that is available for performing the position determination function;
  means for selecting a second UE in the set of associated proximate UEs, wherein the second UE is available for performing the at least one distinct additional requested function; and
  means for initiating a performance of: the position determination function on the first UE and the at least one distinct additional requested function on the second UE.

20. The mobile device of claim 19, further comprising:
  means for associating results of performing the at least one requested function with the mobile device.

21. The mobile device of claim 19, wherein means for initiating the performance of the position determination function on the first UE comprises:
  means for initiating the position determination function position location on the at least one second first UE using at least one of a plurality of position location methods available on the first UE.

22. The mobile device of claim 21, wherein the at least one of the plurality of position location methods available on the first UE comprises:
  Global Navigation Satellite System (GNSS) positioning; or
  Wireless Wide Area Network (WWAN) based positioning; or
  Wireless Local Area Network (WLAN) based positioning; or
  Inertial Measurement Unit (IMU) based positioning based on a prior position of the first UE, wherein the prior position of the first UE was determined within a time window of a current time; or
  some combination thereof.

23. A non-transitory computer-readable medium comprising instructions that are executable by a processor on a mobile device to:
  determine a set of user equipments (UEs) that is associated with the mobile device;
  receive a request to perform a position determination function and at least one distinct additional requested function;

select a first UE in the set of associated UEs that is available for performing the position determination function;

select a second UE in the set of associated UEs, wherein the second UE is available for performing the at least one distinct additional requested function; and initiate a performance of: the position determination function on the first UE, and the at least one distinct additional requested function on the second UE.

24. The computer-readable medium of claim 23, further comprising instructions executable by the processor to:

associate results of performing the at least one requested function with the mobile device.

25. The computer-readable medium of claim 23, wherein the instructions to the initiate performance of the position determination function comprise instructions executable by the processor to:

initiate the position determination function on the first UE using at least one of a plurality of position location methods available on the first UE.

26. The computer-readable medium of claim 25, wherein the plurality of position location methods available on the first UE comprise one or more of:

Global Navigation Satellite System (GNSS) positioning; or

Wireless Wide Area Network (WWAN) based positioning; or

Wireless Local Area Network (WLAN) based positioning; or

Inertial Measurement Unit (IMU) based positioning based on a prior position of the first UE, wherein the prior position of the first UE was determined within a time window of a current time; or some combination thereof.

* * * * *